United States Patent
Kim et al.

(10) Patent No.: US 11,726,178 B2
(45) Date of Patent: Aug. 15, 2023

(54) LIDAR SENSOR APPARATUS AND CONTROL METHOD THEREOF

(71) Applicant: HYUNDAI MOBIS Co., Ltd., Seoul (KR)

(72) Inventors: Young Shin Kim, Yongin-si (KR); Won Gyum Kim, Yongin-si (KR); Kyung Rin Kim, Yongin-si (KR); Sung Eun Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 500 days.

(21) Appl. No.: 16/919,053

(22) Filed: Jul. 1, 2020

(65) Prior Publication Data

US 2021/0011131 A1    Jan. 14, 2021

(30) Foreign Application Priority Data

Jul. 11, 2019    (KR) .......................... 10-2019-0083667

(51) Int. Cl.
  *G01S 7/481*    (2006.01)
  *G01S 17/42*    (2006.01)
  (Continued)

(52) U.S. Cl.
  CPC ........... *G01S 7/4811* (2013.01); *G01S 7/4861* (2013.01); *G01S 7/4916* (2013.01); *G01S 17/42* (2013.01); *G01S 17/931* (2020.01)

(58) Field of Classification Search
  CPC .... G01S 7/4811; G01S 7/4861; G01S 7/4916; G01S 17/42; G01S 17/931; G01S 7/4814; G01S 7/4816; G01S 17/10; G01S 7/4808; G01S 7/4866
  USPC ..... 356/5.01, 614, 305, 4.01, 477, 328, 499, 356/5.03, 2, 237.5, 239.1, 3.01, 3.08, 356/3.09, 310, 330, 338, 339, 4.03, 4.07, 356/432, 478, 482, 5.05, 5.06, 5.09, 5.1, 356/5.12, 51, 521, 603, 610, 616, 617, 356/622, 625, 9, 23, 3, 27, 29, 30, 32, 36, 356/39, 43, 69, 52, 70, 71, 72, 73, 73.1, 356/300, 335, 337, 344, 450, 364, 121, 356/123, 124, 128, 138, 600, 601, 388, 356/399, 402, 426, 429, 445, 213, 237.1,
  (Continued)

(56) References Cited

U.S. PATENT DOCUMENTS

| | | |
|---|---|---|
| 6,400,460 B1 * | 6/2002 | Chen ...................... G01S 17/48 356/615 |
| 2019/0086522 A1 * | 3/2019 | Kubota ................... G01S 17/10 |

FOREIGN PATENT DOCUMENTS

KR    10-2015-0009177    1/2015

* cited by examiner

*Primary Examiner* — Luke D Ratcliffe
(74) *Attorney, Agent, or Firm* — H.C. Park & Associates, PLC (57) ABSTRACT

A LIDAR sensor apparatus and a control method thereof. The LIDAR sensor apparatus includes a transmitter configured to transmit a laser, first and second receivers each configured to receive a reflected signal reflected from an object after the laser is transmitted through the transmitter, a control unit configured to calculate first and second distances by performing signal processing on first and second signals received from the first and second receivers after the laser is transmitted through the transmitter, and to calculate an intermediate distance by performing signal processing on an overlapping signal obtained by overlapping the first and second signals, and an output unit configured to output the first and second distances and the intermediate distance calculated by the control unit.

9 Claims, 7 Drawing Sheets

<HORIZONTAL SENSING LIDAR>

(51) Int. Cl.
*G01S 7/4912* (2020.01)
*G01S 7/4861* (2020.01)
*G01S 17/931* (2020.01)

(58) Field of Classification Search
USPC ......... 356/242.1, 243.1, 244, 247, 256, 900,
356/904, 905, 906, 907, 908, 911, 912,
356/916, 917, 918, 922, 923, 924, 925,
356/926, 927, 928, 955, FOR. 000,
356/FOR. 100, FOR. 105, FOR. 106,
356/FOR. 107, FOR. 126, FOR. 127
See application file for complete search history.

FIG. 1

<HORIZONTAL SENSING LIDAR>

LIDAR SENSOR APPARATUS AND CONTROL METHOD THEREOF

CROSS-REFERENCE TO RELATED APPLICATION

This application claims priority from and the benefit of Korean Patent Application No. 10-2019-0083667, filed on Jul. 11, 2019, which is hereby incorporated by reference for all purposes as if set forth herein.

BACKGROUND

Field

Exemplary embodiments of the present disclosure relate to a LIDAR sensor apparatus and a control method thereof, and more particularly, to a LIDAR sensor apparatus that can overlap signals inputted from a plurality of receivers of a LIDAR sensor to calculate a distance to a virtual detection area between the receivers, thereby improving the resolution of the LIDAR sensor based on signal processing without the addition of hardware, and a control method thereof.

Discussion of the Background

In general, a light detection and ranging (LIDAR) sensor is a sensor that measures a distance and senses an object by using light (for example, laser), and has a principle similar to that of a radar.

However, the radar emits electromagnetic waves to an exterior and checks a distance, a direction and the like with electromagnetic waves that are received again, but the LIDAR emits a pulsed laser. That is, since the LIDAR uses a laser with a short wavelength, it has advantages that precision and resolution are high and three-dimensional detection is possible depending on objects.

Figure 1:
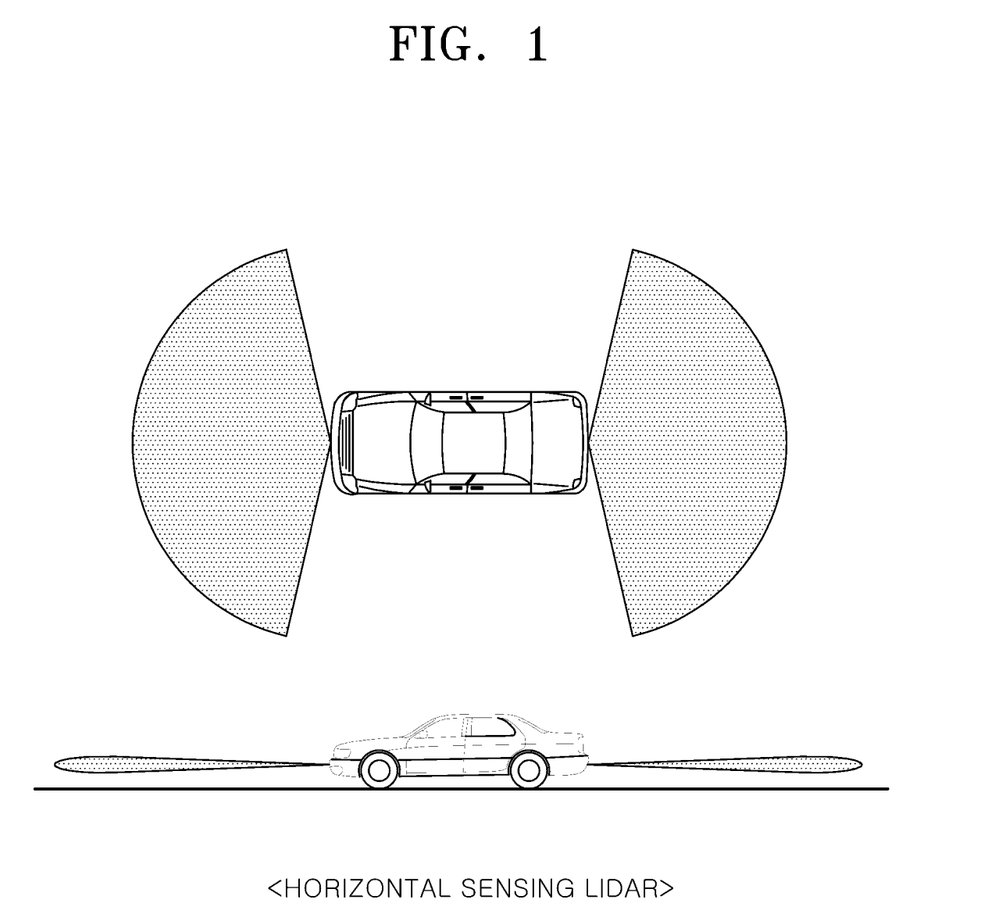
FIG. 1 is a diagram illustrating fields of view (FOV) of LIDAR sensors mounted on front and rear bumpers of a general vehicle.

For example, the LIDAR sensor is mounted on a bumper of a vehicle to sense and detect objects, structures and the like in areas in front of and behind the vehicle. FIG. 1 is a diagram illustrating fields of view (FOV) of LIDAR sensors mounted on front and rear bumpers of a vehicle.

The background art of the present disclosure is disclosed in Korean Patent Application Laid-Open No. 10-2015-0009177 (registered on Jan. 26, 2015 and entitled "LIDAR Sensor System").

SUMMARY

The LIDAR sensor detects one distance through a transmission/reception set including a set of a transmitter that transmits a laser and a receiver that receives a laser reflected from an object.

Therefore, since a larger number of transmission/reception sets are required in order to have a high resolution, it is costly to configure a high-resolution LIDAR sensor.

Various embodiments are directed to providing a LIDAR sensor apparatus that can overlap signals inputted from a plurality of receivers of a LIDAR sensor to calculate a distance to a virtual detection area between the receivers, thereby improving the resolution of the LIDAR sensor based on signal processing without the addition of hardware, and a control method thereof.

In an embodiment, a LIDAR sensor apparatus includes: a transmitter configured to transmit a laser; first and second receivers each configured to receive a reflected signal reflected from an object after the laser is transmitted through the transmitter; a control unit configured to calculate first and second distances by performing signal processing on first and second signals received from the first and second receivers after the laser is transmitted through the transmitter, and to calculate an intermediate distance by performing signal processing on an overlapping signal obtained by overlapping the first and second signals; and an output unit configured to output the first and second distances and the intermediate distance calculated by the control unit.

In an embodiment, the control unit includes: a first signal processing unit configured to amplify the first signal obtained from the reflected signal reflected from the object and received through the first receiver after the laser is transmitted through the transmitter; a second signal processing unit configured to amplify the second signal obtained from the reflected signal reflected from the object and received through the second receiver; an overlapping signal processing unit configured to receive the first signal and the second signal and amplify the overlapping signal obtained by overlapping the first signal and the second signal; a first distance calculation unit configured to calculate a first distance based on the first signal processed by the first signal processing unit; a second distance calculation unit configured to calculate a second distance based on the second signal processed by the second signal processing unit; and an intermediate distance calculation unit configured to calculate the intermediate distance based on the overlapping signal processed by the overlapping signal processing unit.

In an embodiment, the first distance calculation unit calculates the first distance at a time point at which a magnitude of the first signal is equal to or more than a threshold.

In an embodiment, the second distance calculation unit calculates the second distance at a time point at which a magnitude of the second signal is equal to or more than a threshold.

In an embodiment, the intermediate distance calculation unit compares the overlapping signal with the first signal and the second signal, respectively, and calculates the intermediate distance at a time point at which a magnitude of the overlapping signal is equal to or more than the magnitude of the first signal and the magnitude of the second signal.

In an embodiment, the overlapping signal processing unit generates the overlapping signal by overlapping the first signal and the second signal received from the first receiver and the second receiver in a horizontal direction.

In an embodiment, the overlapping signal processing unit generates the overlapping signal by overlapping the first signal and the second signal received from the first receiver and the second receiver in a vertical direction.

In another embodiment, a control method of a LIDAR sensor apparatus includes: a step in which a control unit transmits a laser through a transmitter; a step in which the control unit receives a reflected signal of the laser reflected from an object through each of first and second receivers; a step in which the control unit performs signal processing on the first and second signals received through the first and second receivers and an overlapping signal obtained by overlapping the first and second signals; a step in which the control unit calculates first and second distances and an intermediate distance based on the first and second signals and the overlapping signal; and a step in which the control unit outputs the calculated first and second distances and intermediate distance.

In an embodiment, the overlapping signal is a signal obtained by overlapping the first signal and the second signal in a horizontal direction.

In an embodiment, the overlapping signal is a signal obtained by overlapping the first signal and the second signal in a vertical direction.

In an embodiment, in the step of calculating the distances, the first distance is calculated at a time point at which a magnitude of the first signal is equal to or more than a threshold, the second distance is calculated at a time point at which a magnitude of the second signal is equal to or more than a threshold, and the overlapping signal is compared with each of the first signal and the second signal, and the intermediate distance is calculated at a time point at which a magnitude of the overlapping signal is larger than the magnitude of the first signal and the magnitude of the second signal.

The LIDAR sensor apparatus and a control method thereof apparatus according to the embodiments overlap signals inputted from a plurality of receivers of a LIDAR sensor to calculate a distance to a virtual detection area between the receivers and calculate an intermediate distance between the receivers based on signal processing without the addition of hardware, thereby improving the resolution of the LIDAR sensor.

DETAILED DESCRIPTION OF THE ILLUSTRATED EMBODIMENTS

Hereinafter, a LIDAR sensor apparatus and a control method thereof in accordance with embodiments of the present disclosure will be described below with reference to the accompanying drawings.

In this process, the thicknesses of lines or the sizes of elements illustrated in the drawings may be exaggerated for the purpose of clarity and convenience of explanation. Terms to be described later are terms defined in consideration of functions thereof in the present disclosure and may be changed according to the intention of a user or an operator, or practice. Accordingly, such terms should be defined based on the disclosure over the present specification.

Figure 2:
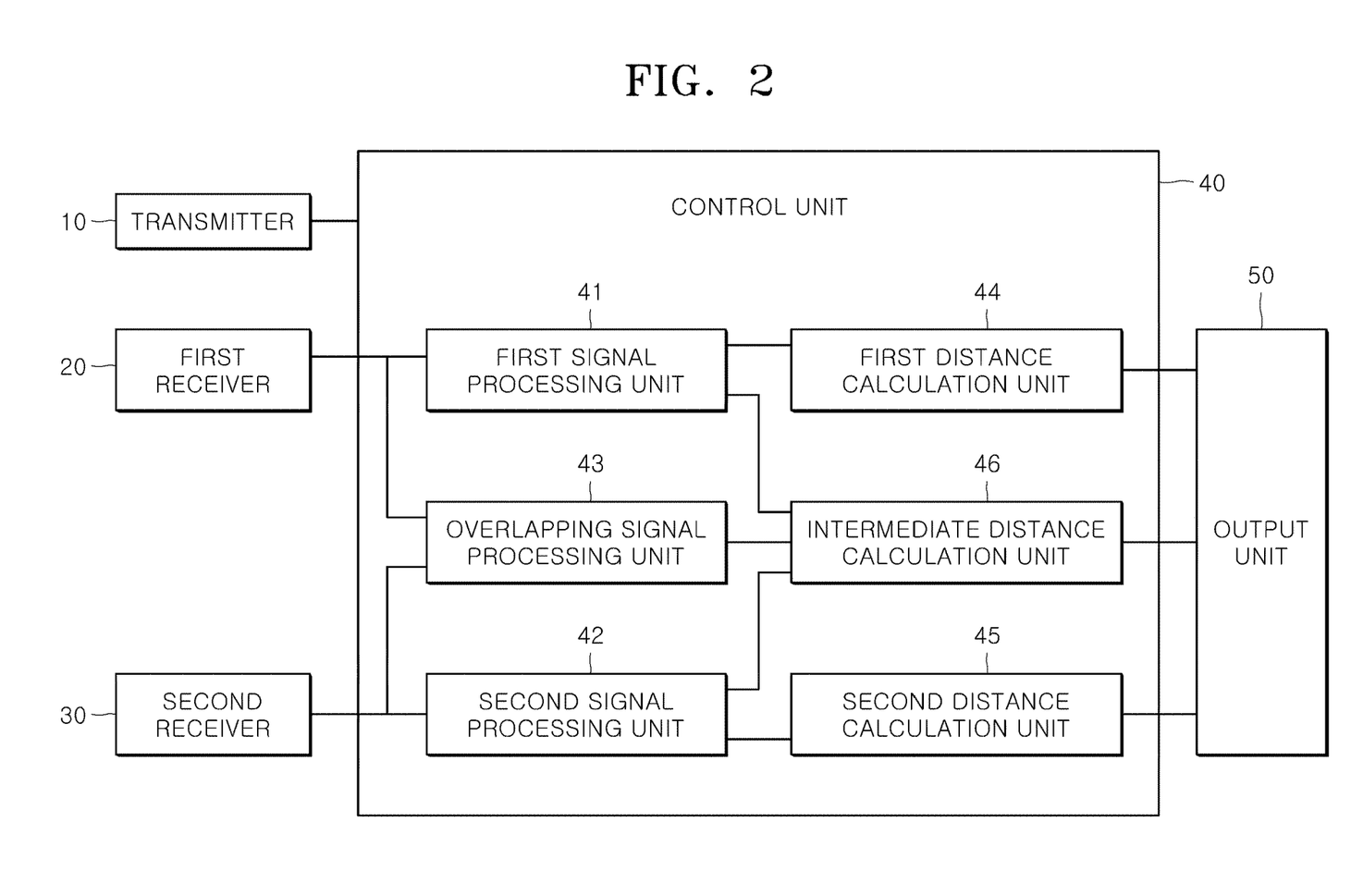
FIG. 2 is a block configuration diagram illustrating a LIDAR sensor apparatus in accordance with an embodiment of the present disclosure.
Figure 3:
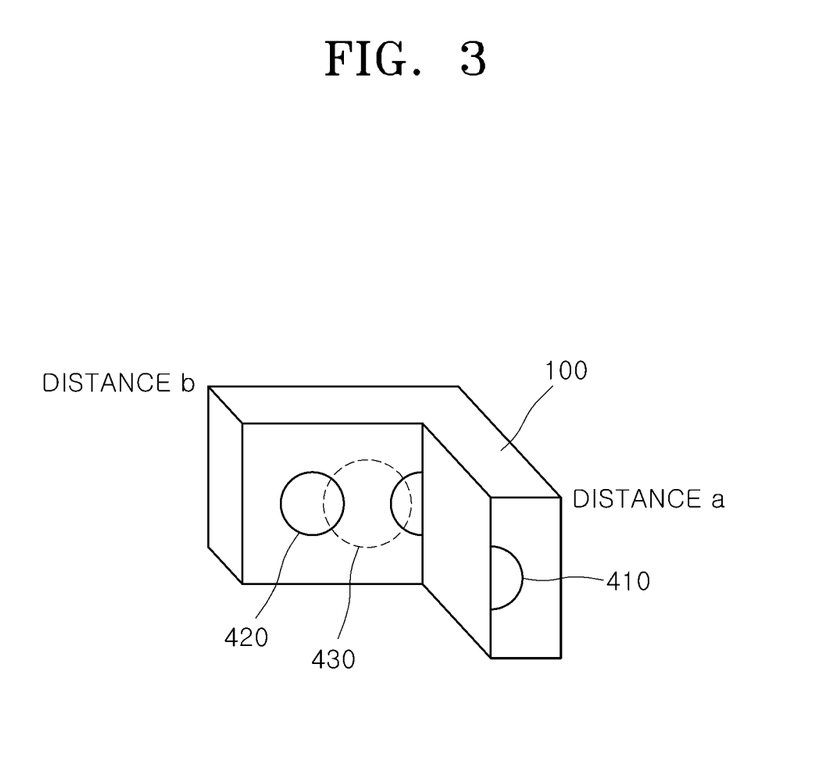
FIG. 3 is a configuration diagram illustrating a detection area by the LIDAR sensor apparatus in accordance with an embodiment of the present disclosure.
Figure 4:
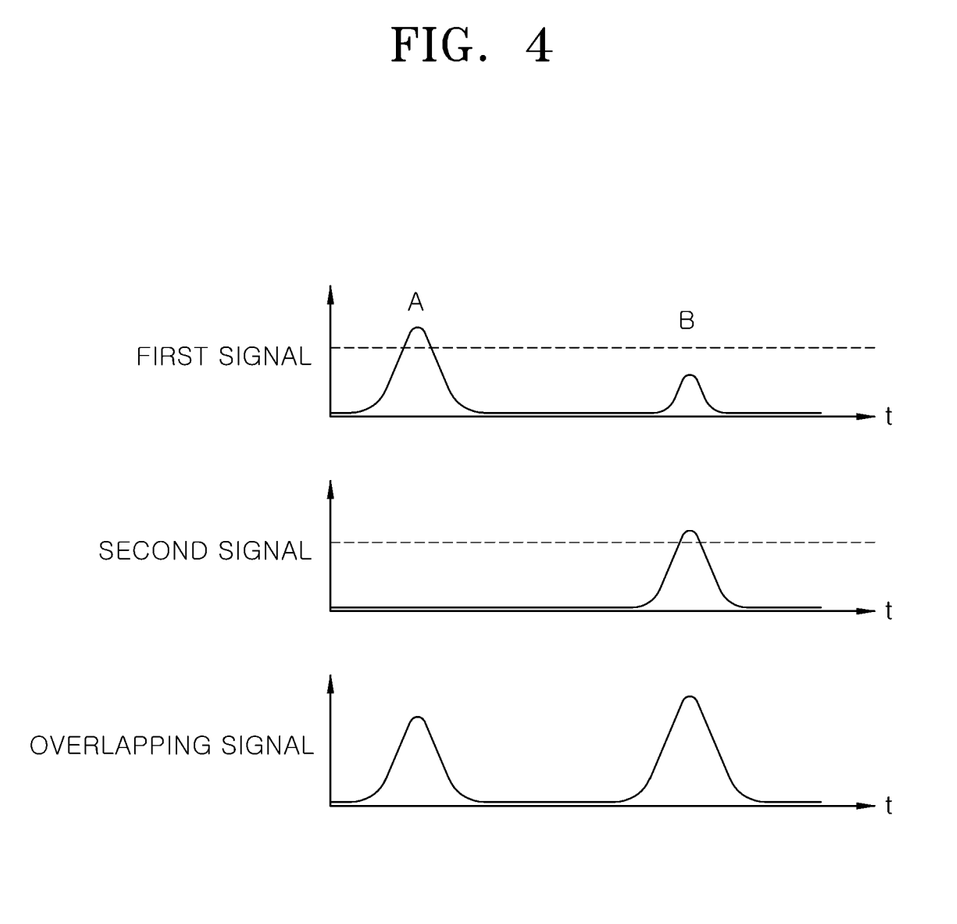
FIG. 4 is a graph illustrating a reflected signal in the LIDAR sensor apparatus in accordance with an embodiment of the present disclosure.
Figure 5A:
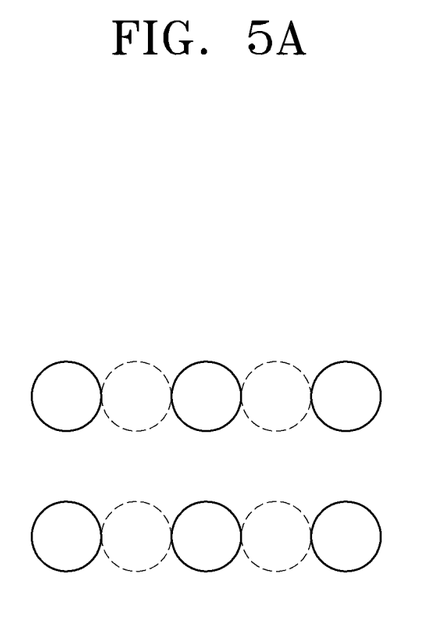
FIG. 5A and FIG. 5B are diagrams illustrating an extended state of resolution by the LIDAR sensor apparatus in accordance with an embodiment of the present disclosure.
Figure 5B:
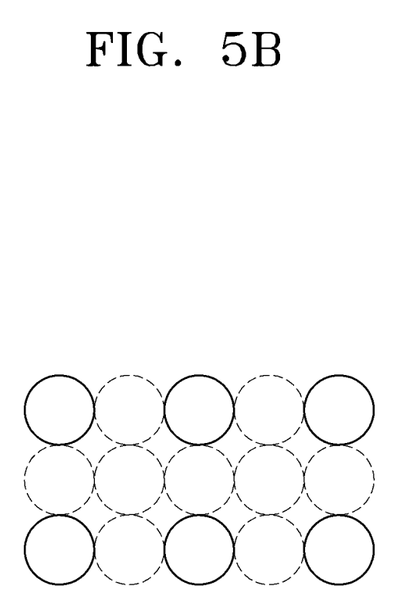

FIG. 2 is a block configuration diagram illustrating a LIDAR sensor apparatus in accordance with an embodiment of the present disclosure, FIG. 3 is a configuration diagram illustrating a detection area by the LIDAR sensor apparatus in accordance with an embodiment of the present disclosure, FIG. 4 is a graph illustrating a reflected signal in the LIDAR sensor apparatus in accordance with an embodiment of the present disclosure, and FIGS. 5A and 5B are diagrams illustrating an extended state of resolution by the LIDAR sensor apparatus in accordance with an embodiment of the present disclosure.

As illustrated in FIG. 2, the LIDAR sensor apparatus in accordance with an embodiment of the present disclosure may include a transmitter 10, first and second receivers 20 and 30, a control unit 40, and an output unit 50.

The transmitter 10 transmits a pulsed laser so that a reflected signal reflected from an object 100 is received and the object 100 may be detected.

The first and second receivers 20 and 30 may provide the control unit 40 with a first signal and a second signal obtained from the reflected signal reflected from the object 100 after the laser is transmitted through the transmitter 10.

The control unit 40 may calculate first and second distances by performing signal processing on the first and second signals received from the first and second receivers 20 and 30 after the laser is transmitted through the transmitter 10, and calculate an intermediate distance by performing signal processing on an overlapping signal obtained by overlapping the first and second signals.

The control unit 40 may include a first signal processing unit 41, a second signal processing unit 42, an overlapping signal processing unit 43, a first distance calculation unit 44, a second distance calculation unit 45, and an intermediate distance calculation unit 46.

The first signal processing unit 41 amplifies the first signal obtained from the reflected signal reflected from the object 100 and received through the first receiver 20 after the laser is transmitted through the transmitter 10, and processes the signal.

The second signal processing unit 42 amplifies the second signal obtained from the reflected signal reflected from the object 100 and received through the second receiver 30, and processes the signal.

The overlapping signal processing unit 43 receives the first signal and the second signal, amplifies the overlapping signal obtained by overlapping the first signal and the second signal, and processes the signal.

For example, as illustrated in FIG. 3, a first detection area 420 by the first receiver 20 may be formed on the front surface of the object 100 at a distance a from an edge of the object 100 and the rear surface of the object 100 at a distance b, and a second detection area 410 by the second receiver 30 may be formed on the rear surface of the object 100 at the distance b.

Accordingly, as illustrated in FIG. 4, the first signal, which is the reflected signal received by the first receiver 20, may be received at time points A and B, and the second signal, which is the reflected signal received by the second receiver 30, may be received at the time point B.

Here, the overlapping signal is a signal obtained by overlapping the first signal and the second signal, and may indicate an overlapping detection area 430 where the first detection area 420 by the first receiver 20 and the second detection area 410 by the second receiver 30 overlap each other as illustrated in FIG. 3.

Accordingly, as illustrated in FIG. 4, the overlapping signal may appear at the time points A and B, but the magnitude thereof at the time point A is substantially the same as the first signal and there is no difference, but the magnitude thereof at the time point B corresponds to the sum of a magnitude of the first signal and a magnitude of the second signal and thus a large difference occurs.

Here, as illustrated in FIG. 5A, the overlapping signal processing unit 43 may generate the overlapping signal by overlapping the first signal and the second signal received from the first receiver 20 and the second receiver 30 in the horizontal direction, thereby increasing the horizontal resolution. As illustrated in FIG. 5B, the overlapping signal processing unit 43 may generate the overlapping signal by overlapping the first signal and the second signal received from the first receiver 20 and the second receiver 30 in the vertical direction, thereby increasing the vertical resolution.

Meanwhile, the overlapping signal processing unit 43 may generate the overlapping signal by overlapping the first signal and the second signal in both the horizontal direction and the vertical direction, may overlap the first signal and the second signal in the diagonal direction, or may generate the overlapping signal by overlapping overlapping signals.

The first distance calculation unit 44 may calculate the first distance at a time point at which the magnitude of the first signal processed by the first signal processing unit 41 is equal to or more than a threshold, based on the first signal.

That is, the first distance calculation unit 44 may calculate the distance a at the time point A based on the first signal.

The second distance calculation unit 45 may calculate the second distance at a time point at which the magnitude of the second signal processed by the second signal processing unit 42 is equal to or more than a threshold, based on the second signal.

That is, the second distance calculation unit 45 may calculate the distance b at the time point B based on the second signal.

Furthermore, the intermediate distance calculation unit 46 may calculate the intermediate distance based on the overlapping signal processed by the overlapping signal processing unit 43.

Here, the intermediate distance calculation unit 46 may compare the overlapping signal with each of the first signal and the second signal, and calculate the intermediate distance at a time point at which the magnitude of the overlapping signal is larger than the magnitude of the first signal and the magnitude of the second signal.

That is, the intermediate distance calculation unit 46 may calculate the distance b at the time point B based on the overlapping signal.

The output unit 50 may output the first distance, the second distance, and the intermediate distance calculated by the control unit 40.

As described above, according to the LIDAR sensor apparatus in accordance with an embodiment of the present disclosure, signals inputted from a plurality of receivers of a LIDAR sensor are overlapped to calculate a distance to a virtual detection area between the receivers and an intermediate distance between the receivers is calculated based on signal processing without the addition of hardware, thereby improving the resolution of the LIDAR sensor.

Figure 6:
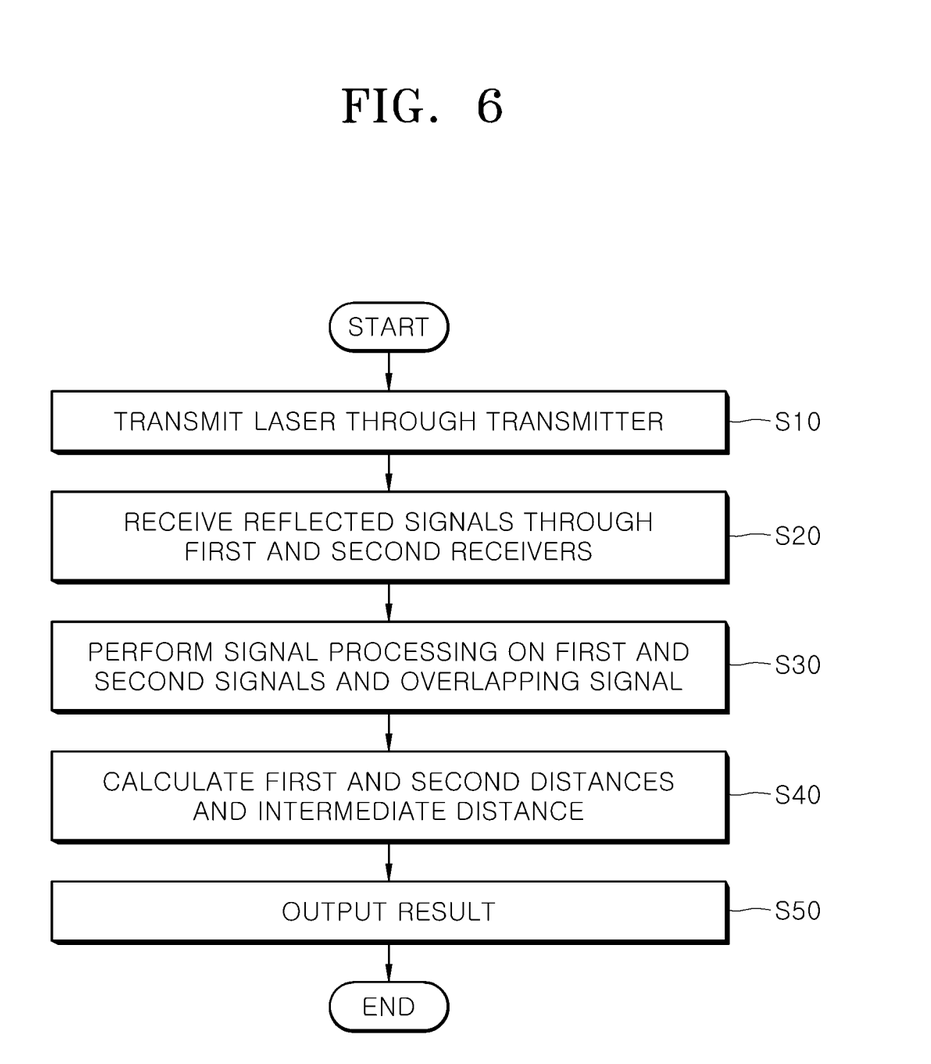
FIG. 6 is a flowchart illustrating a control method of the LIDAR sensor apparatus in accordance with an embodiment of the present disclosure.

FIG. 6 is a flowchart illustrating a control method of the LIDAR sensor apparatus in accordance with an embodiment of the present disclosure.

As illustrated in FIG. 6, in the control method of the LIDAR sensor apparatus in accordance with an embodiment of the present disclosure, the control unit 40 transmits a pulsed laser through the transmitter 10 (S10).

After transmitting the pulsed laser in step S10, the control unit 40 receives a reflected signal of the laser reflected from the object 100 through each of the first and second receivers 20 and 30 (S20).

After receiving the reflected signals in step S20, the control unit 40 amplifies the first and second signals received through the first and second receivers 20 and 30 and the overlapping signal obtained by overlapping the first and second signals, and processes the signals (S30).

Here, the control unit 40 may generate the overlapping signal by overlapping the first signal and the second signal received from the first receiver 20 and the second receiver 30 in the horizontal direction, thereby increasing the horizontal resolution as illustrated in FIG. 5A, and may generate the overlapping signal by overlapping the first signal and the second signal received from the first receiver 20 and the second receiver 30 in the vertical direction, thereby increasing the vertical resolution as illustrated in FIG. 5B.

Meanwhile, the control unit 40 may generate the overlapping signal by overlapping the first signal and the second signal in both the horizontal direction and the vertical direction, may overlap the first signal and the second signal in the diagonal direction, or may generate the overlapping signal by overlapping overlapping signals.

After processing the first and second signals and the overlapping signal in step S30, the control unit 40 calculates the first and second distances and the intermediate distance based on the first and second signals and the overlapping signal (S40).

Here, the control unit 40 may calculate the first distance based on the first signal at a time point, at which the magnitude of the first signal is equal to or more than a threshold, calculate the distance a at the time point A, and calculate the second distance based on the second signal, at a time point at which the magnitude of the second signal is equal to or more than a threshold, and calculate the distance b at the time point B.

Furthermore, the control unit 40 may calculate the intermediate distance based on the overlapping signal. That is, the control unit 40 may compare the overlapping signal with each of the first signal and the second signal, calculate the intermediate distance at a time point at which the magnitude of the overlapping signal is larger than the magnitude of the first signal and the magnitude of the second signal, and calculate the distance b at the time point B.

After calculating the distance to the object 100 in step S40, the control unit 40 outputs the result of the calculated first and second distances and intermediate distance through the output unit 50 (S50).

As described above, according to the LIDAR sensor apparatus and the control method thereof in accordance with embodiments of the present disclosure, signals inputted from a plurality of receivers of a LIDAR sensor are overlapped to calculate a distance to a virtual detection area between the receivers and an intermediate distance between the receivers is calculated based on signal processing without the addition of hardware, thereby improving the resolution of the LIDAR sensor.

The implementations described in the present specification may be implemented with a method or process, an apparatus, a software program, a data stream or signal, for example. Although discussed only in the context of a single form of implementation (for example, discussed only as a method), the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

Although the present disclosure has been described with reference to the embodiments illustrated in the drawings, the embodiments of the disclosure are for illustrative purposes only, and those skilled in the art will appreciate that various modifications and other equivalent embodiments are possible.

Thus, the true technical scope of the disclosure should be defined by the following claims.

What is claimed is:

1. A LIDAR sensor apparatus comprising:
a transmitter configured to transmit a laser;
first and second receivers each configured to receive a reflected signal reflected from an object after the laser is transmitted through the transmitter;
a control unit configured to calculate first and second distances by performing signal processing on first and second signals received from the first and second receivers after the laser is transmitted through the transmitter, and to calculate an intermediate distance by performing signal processing on an overlapping signal obtained by overlapping the first and second signals; and
an output unit configured to output the first and second distances and the intermediate distance calculated by the control unit,
wherein:
the control unit comprises:
a first signal processing unit configured to amplify the first signal obtained from the reflected signal reflected from the object and received through the first receiver after the laser is transmitted through the transmitter;
a second signal processing unit configured to amplify the second signal obtained from the reflected signal reflected from the object and received through the second receiver;
an overlapping signal processing unit configured to receive the first signal and the second signal and amplify the overlapping signal obtained by overlapping the first signal and the second signal;
a first distance calculation unit configured to calculate a first distance based on the first signal processed by the first signal processing unit;
a second distance calculation unit configured to calculate a second distance based on the second signal processed by the second signal processing unit; and
an intermediate distance calculation unit configured to calculate the intermediate distance based on the overlapping signal processed by the overlapping signal processing unit; and
the intermediate distance calculation unit compares the overlapping signal with each of the first signal and the second signal, and calculates the intermediate distance at a time point at which a magnitude of the overlapping signal is larger than the magnitude of the first signal and the magnitude of the second signal.

2. The LIDAR sensor apparatus according to claim 1, wherein the first distance calculation unit calculates the first distance at a time point at which a magnitude of the first signal is equal to or more than a threshold.

3. The LIDAR sensor apparatus according to claim 1, wherein the second distance calculation unit calculates the second distance at a time point at which a magnitude of the second signal is equal to or more than a threshold.

4. The LIDAR sensor apparatus according to claim 1, wherein the overlapping signal processing unit generates the overlapping signal by overlapping the first signal and the second signal received from the first receiver and the second receiver in a horizontal direction.

5. The LIDAR sensor apparatus according to claim 1, wherein the overlapping signal processing unit generates the overlapping signal by overlapping the first signal and the second signal received from the first receiver and the second receiver in a vertical direction.

6. A control method of a LIDAR sensor apparatus, the control method comprising:
a step in which a control unit transmits a laser through a transmitter;
a step in which the control unit receives a reflected signal of the laser reflected from an object through each of first and second receivers;
a step in which the control unit performs signal processing on the first and second signals received through the first and second receivers and an overlapping signal obtained by overlapping the first and second signals;
a step in which the control unit calculates first and second distances and an intermediate distance based on the first and second signals and the overlapping signal, wherein the overlapping signal is compared with each of the first signal and the second signal, and the intermediate distance is calculated at a time point at which a magnitude of the overlapping signal is greater than the magnitude of the first signal and the magnitude of the second signal; and
a step in which the control unit outputs the calculated first and second distances and intermediate distance.

7. The control method according to claim 6, wherein the overlapping signal is a signal obtained by overlapping the first signal and the second signal in a horizontal direction.

8. The control method according to claim 6, wherein the overlapping signal is a signal obtained by overlapping the first signal and the second signal in a vertical direction.

9. The control method according to claim 6, wherein, in the step of calculating the distances,
the first distance is calculated at a time point at which a magnitude of the first signal is equal to or more than a threshold, and
the second distance is calculated at a time point at which a magnitude of the second signal is equal to or more than a threshold.

* * * * *